US012561261B1

(12) United States Patent
Brueggen

(10) Patent No.: US 12,561,261 B1
(45) Date of Patent: Feb. 24, 2026

(54) TWO-LEVEL CONTEXT CACHING AND EVICTION FOR SCATTER-GATHER DMA

(71) Applicant: Hewlett Packard Enterprise Development LP, Spring, TX (US)

(72) Inventor: Christopher Michael Brueggen, Allen, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/913,715

(22) Filed: Oct. 11, 2024

(51) Int. Cl.
| | |
|---|---|
| *G06F 13/28* | (2006.01) |
| *G06F 9/30* | (2018.01) |
| *G06F 9/38* | (2018.01) |
| *G06F 12/122* | (2016.01) |

(52) U.S. Cl.
CPC .......... *G06F 13/28* (2013.01); *G06F 9/30047* (2013.01); *G06F 9/3814* (2013.01); *G06F 12/122* (2013.01)

(58) Field of Classification Search
CPC .... G06F 13/28; G06F 9/30047; G06F 9/3814; G06F 12/122
See application file for complete search history.

(56) References Cited

U.S. PATENT DOCUMENTS

| | | | | |
|---|---|---|---|---|
| 8,495,301 | B1 * | 7/2013 | Alexander | G06F 13/28 710/22 |
| 9,384,036 | B1 * | 7/2016 | Barroso | G06F 12/0875 |
| 2001/0049818 | A1 * | 12/2001 | Banerjia | G06F 11/3471 717/160 |
| 2005/0027901 | A1 * | 2/2005 | Simon | G06F 9/30036 710/22 |
| 2014/0317333 | A1 * | 10/2014 | Dorst | G06F 13/28 710/308 |
| 2018/0004690 | A1 * | 1/2018 | Kaminski | G06F 13/1663 |

* cited by examiner

*Primary Examiner* — Phong H Dang
(74) *Attorney, Agent, or Firm* — Yao Legal Services, Inc.

(57) ABSTRACT

One aspect of the instant disclosure may provide a system and method for processing scatter-gather direct memory access (S-G DMA) instructions. During operation, the system may receive an S-G DMA instruction associated with a message and gather instruction context for the S-G DMA instruction. An S-G DMA processor may process the S-G DMA instruction based on the gathered instruction context and determine whether there exists a pending S-G DMA instruction associated with the message. In response to the presence of the pending S-G DMA instruction, the system stores the instruction context in a hot context cache at an address corresponding to the pending S-G DMA instruction. In response to the absence of the pending S-G DMA instruction, the system stores the instruction context in a cold context cache.

20 Claims, 7 Drawing Sheets

INSTRUCTIONS IN

INSTRUCTIONS OUT

100

INSTRUCTIONS IN

INSTRUCTION
TRACKER
102

ARBITRATOR
104

HOT CONTEXT CACHE
110

S-G DMA
PIPELINE
106

COLD CONTEXT CACHE
112

S-G DMA
PROCESSOR
108

EVICTION QUEUE
114

INSTRUCTIONS OUT

100

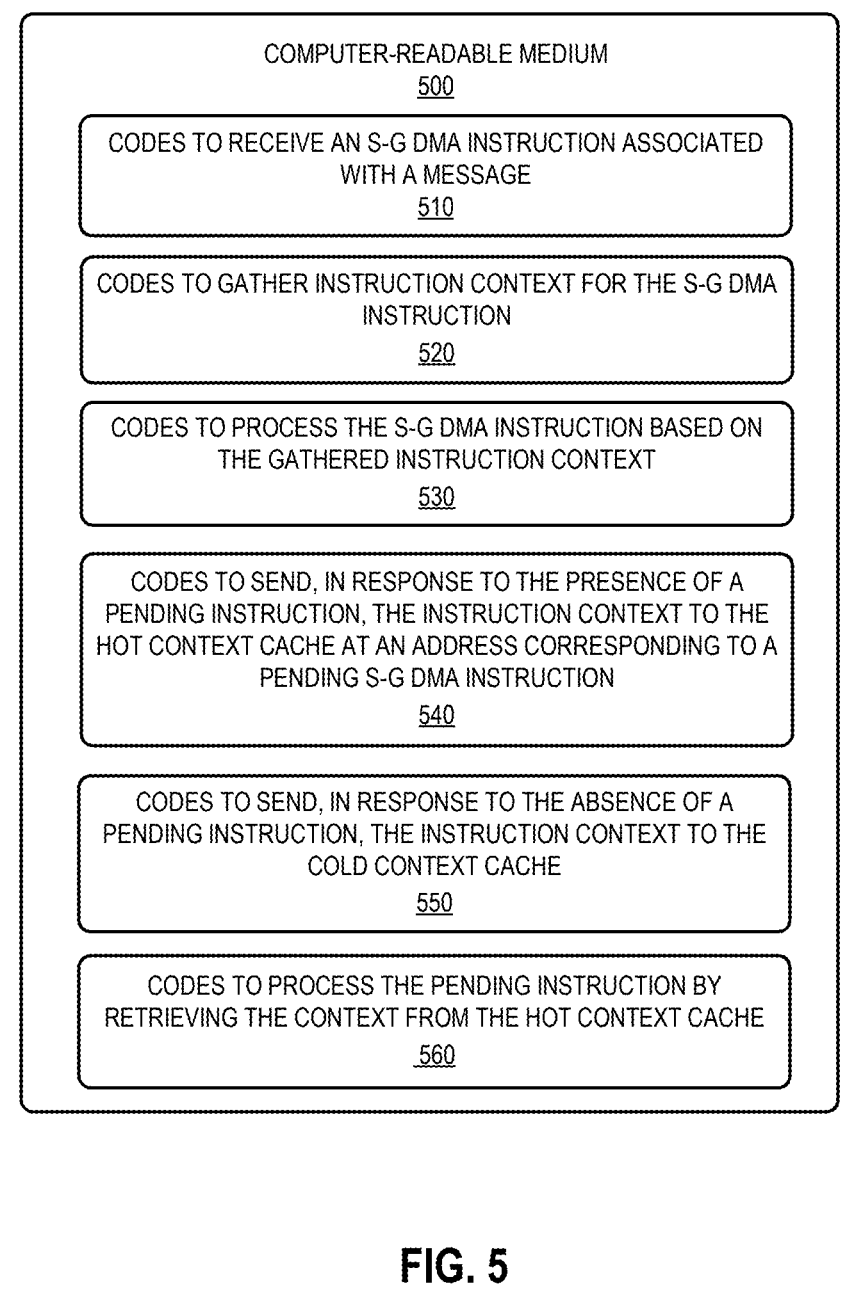

COMPUTER-READABLE MEDIUM
500

CODES TO RECEIVE AN S-G DMA INSTRUCTION ASSOCIATED WITH A MESSAGE
510

CODES TO GATHER INSTRUCTION CONTEXT FOR THE S-G DMA INSTRUCTION
520

CODES TO PROCESS THE S-G DMA INSTRUCTION BASED ON THE GATHERED INSTRUCTION CONTEXT
530

CODES TO SEND, IN RESPONSE TO THE PRESENCE OF A PENDING INSTRUCTION, THE INSTRUCTION CONTEXT TO THE HOT CONTEXT CACHE AT AN ADDRESS CORRESPONDING TO A PENDING S-G DMA INSTRUCTION
540

CODES TO SEND, IN RESPONSE TO THE ABSENCE OF A PENDING INSTRUCTION, THE INSTRUCTION CONTEXT TO THE COLD CONTEXT CACHE
550

CODES TO PROCESS THE PENDING INSTRUCTION BY RETRIEVING THE CONTEXT FROM THE HOT CONTEXT CACHE
560

FIG. 5

TWO-LEVEL CONTEXT CACHING AND EVICTION FOR SCATTER-GATHER DMA

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Field

This disclosure is generally related to scatter-gather direct memory access (DMA). More specifically, this disclosure is related to context caching in scatter-gather DMA operations.

Related Art

Scatter-gather Direct Memory Access (DMA) is a sophisticated technique employed in applications demanding high bandwidth and low latency data transfers between memory and peripherals, such as high-performance computing (HPC) systems. This method offers significant advantages over traditional DMA approaches. Unlike conventional DMA, which is limited to transferring data in a single, contiguous block, scatter-gather DMA allows the transfer of non-contiguous memory blocks, thus providing greater flexibility in memory usage and can lead to substantial performance improvements.

Message Passing Interface (MPI) allows parallel tasks in HPC applications to collaborate through message exchange. When scatter-gather DMA is used, a message may be transmitted as a series of packets, and each packet transmission typically involves processing a corresponding instruction containing crucial information such as memory address and size.

After an instruction is processed, it is beneficial to cache the context of the instruction (e.g., the memory addresses of DMA operations associated with the instruction) for use by subsequent instructions to reduce the DMA processing time and bandwidth usage. Without context caching, the starting context would need to be constructed for each instruction, requiring lengthy DMA reads from host memory. Host memory bandwidth would be wasted due to reading the same context from the memory multiple times. Context caching may also be useful when the processing of an instruction is temporarily paused.

BRIEF DESCRIPTION OF THE FIGURES

FIG. 5 illustrates a computer-readable medium that facilitates the operation of the two-level cache system, according to one aspect of the instant application.

In the figures, like reference numerals refer to the same figure elements.

DETAILED DESCRIPTION

Figure 1:
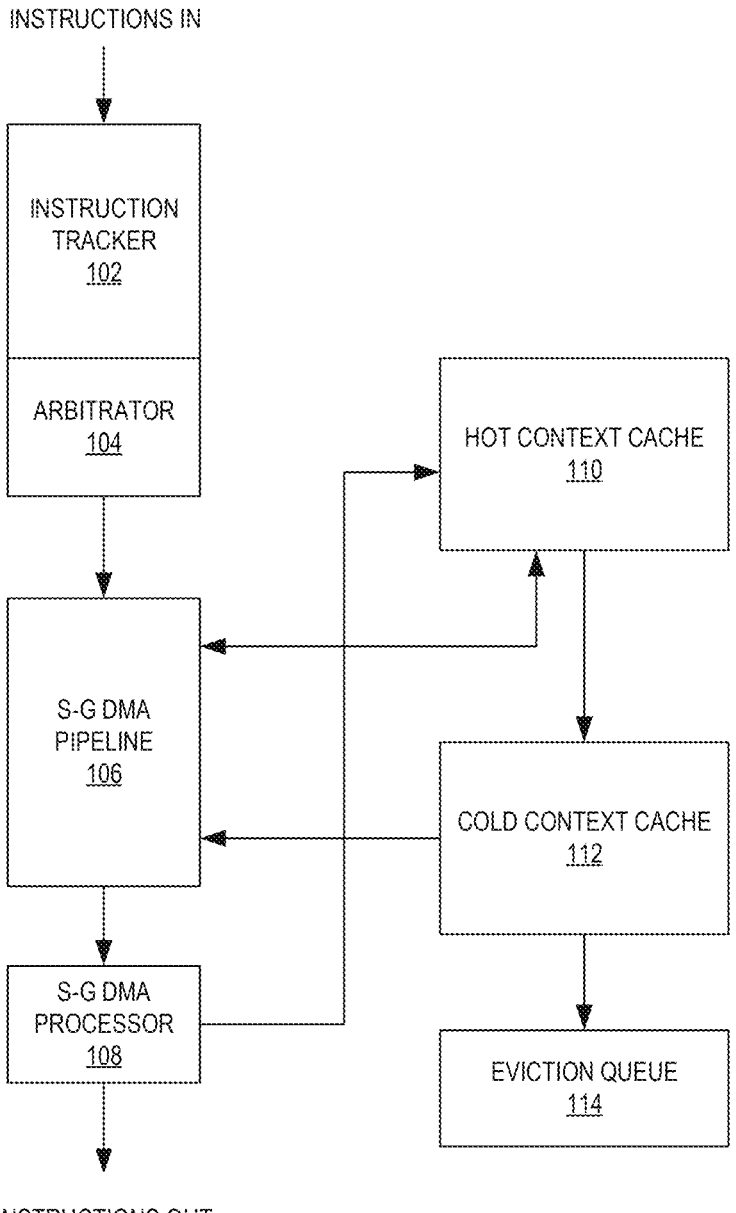
FIG. 1 illustrates an example schematic diagram of a scatter-gather Direct Memory Access (S-G) DMA engine, according to one aspect of the instant application.

In the context of MPI, scatter-gather DMA (S-G DMA) may offer several advantages, including efficient memory utilization and reduced CPU overhead. For example, MPI allows a user to provide a base address to start a transfer and a datatype (which describes the layout of data in memory) to apply to that transfer. MPI also provides a mechanism called "derived datatypes," which may describe more complex data structures and use that description for certain MPI calls (e.g., MPI_Send and MPI_Recv). Historically, using derived datatypes in MPI can result in poor performance, because the library must interpret the data description in order to perform copies into and out of an internal buffer for MPI_Send and the MPI_Recv commands, respectively. As a result, the pack and unpack operations are still performed in software and still serialized with the communications, which can result in inefficiencies in the overall performance of data-related operations, such as scatter-gather DMA operations.

Hardware solutions have been developed to improve data operation efficiency. For example, a network interface card (NIC) may incorporate a specifically designed scatter-gather (S-G) DMA engine (also referred to as a datatype engine), which allows users to describe complex data layouts for sending and receiving data, including a multi-dimensional array with unique strides in each of the multiple dimensions. This S-G DMA engine can perform the above-described scatter-gather DMA operations, which can eliminate the inefficient data copies used in the prior software solutions. The S-G DMA engine can reside in the network interface card (NIC) or an application-specific integrated circuit (ASIC) of the NIC, including as part of an outbound packet engine and an inbound packet engine.

The S-G DMA engine may further reduce the DMA processing time and the consumption of the host memory bandwidth by caching the instruction context. While context-caching provides significant benefits, efficient management of the cache may be challenging.

In some aspects of this disclosure, to improve the efficiency in the storage and transfer of the instruction context, the S-G DMA engine on the network interface controller (NIC) of the host may include a two-level context cache system to cache the instruction context in both the processing-paused and processing-complete scenarios. This two-level cache system may include a hot context cache that may be directly written by the S-G DMA processor and a cold context cache that may not be directly written by the S-G DMA processor. The hot context cache may be used to store imminently needed instruction context (i.e., hot context), whereas the cold context cache may be used to store instruction context that may not be needed for a while (i.e., cold context). In some aspects, the hot context cache may include a one-way cache, whereas the cold context cache may include a four-way cache or a one-way cache.

In the processing-complete scenario, after processing an instruction, the S-G DMA engine may determine whether there is a pending instruction (i.e., an instruction in the instruction tracker or buffer of the S-G DMA engine) of the same message. If so, the S-G DMA engine may cache the instruction context in the hot context cache at an address corresponding to the pending instruction. This way, the instruction context may be directly transferred from the leader instruction (i.e., the processed instruction) to the follower instruction (i.e., the pending instruction) without the need to reload from the host memory. If there is no pending instruction, the instruction context may be stored in the cold context cache, which may be accessed, when needed, by an instruction of the same message. After all instructions of a message are processed (e.g., after processing an instruction flagged as the end-of-message), entries related to the message in either the hot or cold context cache will be evicted.

In the processing-paused scenario, the context of the paused instruction may be written into the hot context cache at an address corresponding to the paused instruction. When the S-G DMA processor resume processing of the instruction, the instruction context may be read from the hot context cache.

FIG. 1 illustrates an example schematic diagram of a scatter-gather Direct Memory Access (S-G) DMA engine, according to one aspect of the instant application. The S-G DMA engine may be part of a network interface card (NIC), such as being part of an application-specific integrated circuit (ASIC) of the NIC. More specifically, a NIC may include an S-G DMA engine on both the transmitting and receiving paths to process S-G DMA instructions associated with transmitted and received messages.

In the example shown in FIG. 1, S-G DMA engine 100 includes an instruction tracker 102, an arbitrator 104, an S-G DMA pipeline 106, an S-G DMA processor 108, a hot context cache 110, a cold context cache 112, and an eviction queue 114. S-G DMA engine 100 may include more components than those shown in FIG. 1. For example, the various logic units for managing the caches (including hot context cache 110 and cold context cache 112) are not shown in FIG. 1. S-G DMA engine 100 may also include a buffer storing the input/output vector (IOVEC) entries and/or context fast-forward entries associated with instruction context cached in hot context cache 110 and cold context cache 112. Each IOVEC entry may include a list of addresses (or offsets) and lengths. Each context fast-forward entry may include a description of a starting point within a nested-loop memory access pattern (e.g., the loop count values and byte offset within a data element). Such a buffer is referred to as an ICB buffer. Instruction context containing a list of ICB entries may be referred to as IOVEC processing context, whereas instruction context containing nested loop counter values may be referred to as derived-datatype processing context. S-G DMA engine 100 may further include a descriptor storage storing datatype descriptors. Each datatype descriptor may contain various information about the S-G DMA operations to be performed. In one example, a datatype descriptor may represent a multi-dimensional array defined by a number of data elements per dimension, a data-element size, and a stride. In another example, a datatype descriptor may reference an IOVEC structure with absolute or relative addressing.

Instruction tracker 102 may include a memory block that buffers a plurality of to-be-processed datatype (or S-G DMA) instructions associated with a plurality of packets. Note that instructions pending in tracker 102 may be associated with different messages. In some aspects, datatype instructions corresponding to the packets of a message may enter S-G DMA engine 100 in order (i.e., according to the order of the packets, as they are constructed and transmitted by the NIC). In alternative aspects, datatype instructions corresponding to the packets of a message may enter S-G DMA engine 100 out-of-order, as the packets are received by the NIC out-of-order. In some examples, instruction tracker 102 may include 256 entries. Each datatype instruction may include a message ID and sequence number (e.g., the packet sequence number). The message ID may be used to associate tracked instructions of the same message. Different higher-level identifiers for different types of messages (e.g., Put Request vs. Get Response; Unrestricted vs. Restricted) may be encoded into generic message IDs to allow unified context caching for the different types of messages.

Arbitrator 104 may be responsible for selecting an instruction from instruction tracker 102 to send to S-G DMA pipeline 106. In some aspects, arbitrator 104 may perform round-robin arbitration among the entries in tracker 102. In addition to entries (e.g., S-G DMA instructions) in tracker 102, commands for deallocating messages (referred to as DEALLOC_M commands) may also gain access to S-G DMA pipeline 106. Some tracker entries may attempt to transfer instruction context from hot context cache 110 to cold context cache 112 (e.g., HOT-2COLD commands), and such entries may have the highest priority in accessing S-G DMA pipeline 106, followed by the DEALLOC_M commands. Tracker entries ready for any processing other than the hot-to-cold cache transfer have the lowest priority and may be arbitrated in a round-robin fashion.

S-G DMA pipeline 106 is responsible for gathering information needed to process the datatype instruction. For example, for an instruction entering S-G DMA pipeline 106 (i.e., after winning the arbitration), the pipeline may determine whether the instruction context (e.g., the number of bytes that have been transferred so far, information about the ICB buffer entries, etc.) can be found in the cache (either hot context cache 110 or cold context cache 112). If so, S-G DMA pipeline 106 may retrieve the cached context. Otherwise, S-G DMA pipeline 106 may retrieve the context from the host memory using a datatype descriptor associated with the instruction.

The instruction context may include a pointer to the ICB buffer, and S-G DMA pipeline 106 may obtain the corresponding ICB entries (e.g., one or more IOVEC entries or a datatype fast-forward entry. Given a three-dimensional array of data elements in host memory, the datatype fast-forward entry may include a number of elements in each dimension, the stride in each dimension, and the size of a data element to be transferred. On the other hand, an IOVEC entry may include a list of addresses (or offsets when relative addressed is used) and lengths.

S-G DMA processor 108 is responsible for processing the datatype or S-G DMA instruction based on the instruction context gathered by S-G DMA pipeline 106. In some aspects, for each datatype or S-G DMA instruction, S-G DMA processor 108 may generate one or more DMA instructions defining a plurality of DMA read/write operations. For example, in the outbound direction, S-G DMA processor 108 may issue a DMA read instruction which results in a read request to the host memory using the address information identified by the instruction context. In the inbound direction, S-G DMA processor 108 may issue a DMA write instruction which results in the transfer of the payload in a received packet to the host memory.

When S-G DMA processor 108 pauses the processing of an instruction (e.g., due to depleted output queue credits), S-G DMA pipeline 106 may write the current instruction context into hot context cache 110, and the corresponding tracker entry in instruction tracker 102 may request arbitration to gain access to S-G DMA pipeline 106 immediately.

After S-G DMA processor 108 completes the processing of an instruction (e.g., after the entire payload of the corresponding packet has been transferred to or from the host memory), it may determine whether there is a pending instruction of the same message. In some aspects, S-G DMA processor 108 may determine whether an instruction with the same message ID and a subsequent packet sequence number is present in instruction tracker 102. If so, S-G DMA processor 108 may instruct S-G DMA pipeline 106 to write the instruction context into hot context cache 110. More specifically, the instruction context may be written to a location in hot context cache 110 corresponding to the next to-be-processed instruction of the same message. In some aspects, the number of entries in hot context cache 110 corresponds to the number of entries in instruction tracker 102, and the tracker entry number may be used as the location index (e.g., the cache index) within hot context cache 110 for caching the context. For example, if the tracker entry number for the next pending instruction is i, the context of the processed instruction may be written to hot context cache 110 as the $i_{th}$ entry. When the pending instruction enters S-G DMA pipeline 106, the corresponding instruction context may be retrieved from hot context cache 110 using index i. This way, the instruction context of a leader instruction may be directly transferred to a follower instruction.

If there is no pending instruction of the same message (i.e., no instruction with the same message ID and a subsequent sequence number can be found in instruction tracker 102), S-G DMA processor 108 may instruct S-G DMA pipeline 106 to transfer the instruction context to cold context cache 110 (e.g., using the HOT_2COLD command) at an address derived from the message ID and an increment of the packet sequence number included in the instruction. More specifically, because S-G DMA processor 108 does not directly write into the cold context cache, the instruction context may first be written back to hot context cache 110 at a location corresponding to the processed instruction and then be transferred to cold context cache 112. In some aspects, after the context is written to hot context cache 110, the entry in instruction tracker 102 which has just completed processing of the instruction may be put into a HOT_2COLD state. An entry in the HOT_2COLD state will arbitrate for access to S-G DMA pipeline 106. When the pipeline is accessed by the entry, a HOT_2COLD command may be generated and presented to hot context cache 110. As discussed previously, tracker entries generating HOT_2COLD commands have the highest priority in accessing S-G DMA pipeline 106, thus ensuring timely transfer of the instruction context.

In some aspects, the message ID may be wholly or partially used as the address (e.g., the address of the random-access memory (RAM) per cache way) within cold context cache 112 for caching the context. In such aspects, the message ID and packet sequence number may be used as a key to fully identify cached context. When S-G DMA pipeline 106 receives an instruction which may belong to the same message as a previously processed instruction, it may search cold context cache 112 using the message ID and packet sequence number as the search key. In one example, cold cache 112 may be a four-way cache, and S-G DMA pipeline 106 may read the entry in each way of cold cache 112 at the address corresponding to the message ID and check for the search key in each valid entry. If a matching entry is found (i.e., it has the same message ID and packet sequence number), the context may be retrieved from cold context cache 112, and the cache entry is invalidated subsequently. Otherwise, cold cache 112 may indicate that no matching instruction context is found.

Eviction queue 114 is responsible for queueing context from context cache entries that have been evicted. The context from a context cache entry may contain a list of ICB entries needing to be freed when the context is evicted. In one example, the last instruction of a message may be flagged as end-of-message. Subsequent to processing the end-of-message instruction, S-G DMA pipeline 106 may transfer the instruction context corresponding to the end-of-message instruction from hot context cache 110 and a list of any possible ICB entries referenced in the context to eviction queue 114. In addition, when S-G DMA engine 100 receives a DEALLOC_M command (which indicates that a message with the corresponding message ID has been processed completely), it may read cold context cache 112 (e.g., using the message ID as the address) to locate and transfer any entries with the matching message ID to eviction queue 114. After eviction, those cold cache entries will be invalidated.

Figure 2:
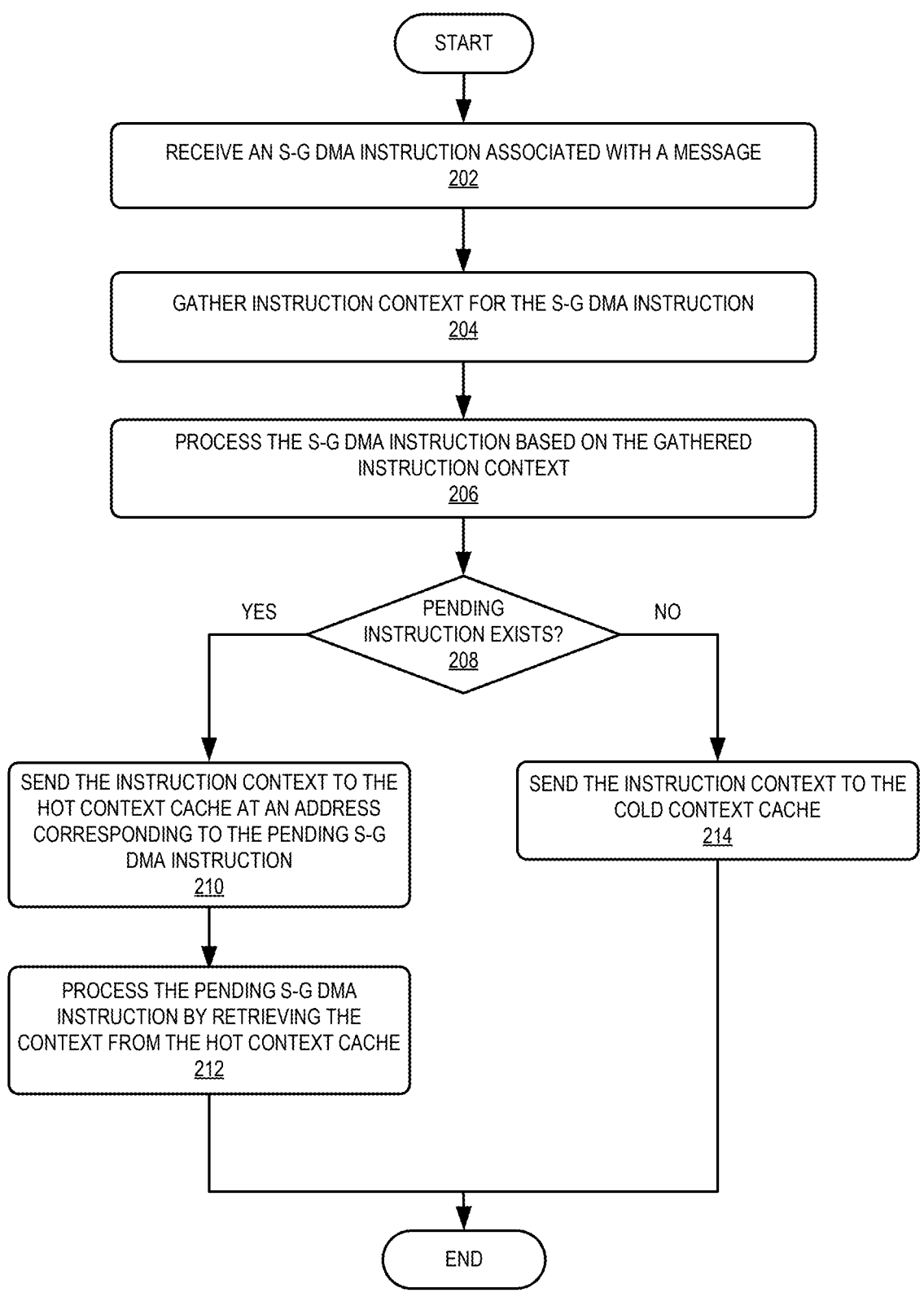
FIG. 2 presents a flowchart illustrating an example process for processing scatter-gather DMA instructions and caching the instruction context, according to one aspect of the instant application.

FIG. 2 presents a flowchart illustrating an example process for processing scatter-gather DMA instructions and caching the instruction context, according to one aspect of the instant application. The process may be performed by an S-G DMA engine on the NIC of a host device. The S-G DMA engine may be implemented using hardware, firmware, software components, or a combination thereof.

During operation, the S-G DMA pipeline (which may be part of an S-G DMA engine) may receive an S-G DMA instruction associated with a message (operation 202). In some aspects, the message may be an MPI message, and the S-G DMA instruction may correspond to a packet (which may be a to-be-transmitted or has-been-received packet) belonging to the message. The S-G DMA instruction may include a message ID and a packet sequence number. In some aspects, the S-G DMA instruction may be selected by an arbitrator from an instruction tracker. In further aspects, the arbitrator may use a round-robin arbitration scheme to select a tracker entry to access the S-G DMA engine.

The S-G DMA pipeline in the S-G DMA engine may gather instruction context for the S-G DMA instruction (operation 204). The instruction context may reflect the state (e.g., the hardware and/or software state) of the S-G DMA engine, including the state of the tracker entry and the state of the S-G DMA processor. More specifically, as the instruction traverses the S-G DMA pipeline, the pipeline may collect information such as the number of bytes transferred so far for that instruction, one or more pointers to the ICB buffer, etc. Note that the ICB entries may include IOVEC entries and/or datatype fast-forward entries. If the to-be-accessed host memory locations are described using a set of IOVEC entries, the instruction context may include a pointer to the first IOVEC entry in the set. If the memory locations are described using datatype fast-forward entries, the instruction context may include the loop count value for each dimension of a three-dimensional array of memory and a byte offset within the starting data element.

The S-G DMA processor in the S-G DMA engine may then process the S-G DMA instruction based on the gathered instruction context (operation 206). In some aspects, the S-G DMA processor may generate one or more DMA commands based on the address and size information included in the ICB entries referenced by the instruction context. The generated DMA commands (e.g., DMA read or write commands) may cause data to be loaded from or written into the corresponding memory locations.

Subsequent to processing the S-G DMA instruction, the engine may determine whether there exists a pending S-G DMA instruction associated with the same message (operation 208). In some aspects, the instruction tracker may be searched to determine whether an instruction with the same message ID exists in the tracker.

In response to the presence of a pending S-G DMA instruction, the processor may send the instruction context to the hot context cache at an address corresponding to the pending S-G DMA instruction (operation 210). More specifically, the index of the hot context cache entry (e.g., its entry number) may correspond to the tracker entry number of the pending S-G DMA instruction. The hot context cache may be directly accessible by the S-G DMA processor, meaning that the S-G DMA processor may directly write into the hot context cache.

The S-G DMA processor may subsequently process the pending S-G DMA instruction associated with the same message by retrieving the instruction context from the hot context cache (operation 212).

In response to the absence of a pending S-G DMA instruction, the processor may send the instruction context to a cold context cache (operation 212). Note that the DMA processor does not directly write into the cold context cache. Therefore, to send the instruction context to the cold context cache, the processor may need to write the instruction context to the hot context cache first (e.g., at a location corresponding to the processed instruction) and then update the tracker entry state such that it will generate a command to transfer the context from the hot context cache to the cold context cache (e.g., a HOT_2COLD command). The instruction tracker entry may then bid for access to the S-G DMA pipeline, where the HOT_2COLD command is generated. Tracker entries imminently generating HOT_2COLD commands have the highest priority in accessing the S-G DMA pipeline where the HOT_2COLD commands are generated and sent to the cache system. Upon receiving the command, the cache system may transfer the instruction context from the hot context cache to an entry in a way of the cold context cache at an address (e.g., the RAM address) corresponding to the message ID.

In some aspects, the cold context cache may include a four-way cache and may implement the Least Recently Used (LRU) cache replacement policy. When transferring context from the hot context cache to the cold context cache, the cache logic may determine whether there are existing non-idle entries at the target cache index (e.g., due to cache collision). If so, the cache logic may determine whether there is an idle entry at the target index. If there is an idle entry, the cache logic may place the context from the hot context cache into the idle entry in the cold context cache. If not, the LRU entry may be replaced. After the context is transferred to the cold context cache, the entry in the hot context cache may be invalidated.

In some aspects, instructions of a message are processed in order, and the completion of a message is inferred when an instruction flagged as the end of a message (which indicates the completion of the message processing) is processed. In such a scenario, the cold context cache may be a one-way cache, where the packet sequence numbers are implicit, since the instructions per message are processed in order. In alternative aspects, instructions of a message may be processed out of order, and the completion of the message processing is indicated by an external command (e.g., a message-deallocation command) input to the S-G DMA engine, which conveys the message ID. In such a scenario, the cold context cache may be a multi-way cache (e.g., a four-way cache), and the cached context should be identified by both the message ID and packet sequence number. Each way of the four-way cache may include a RAM, and a cache read involves reading all the ways in parallel using the address derived from message ID. Each cache entry contains a key comprised of the message ID and packet sequence number.

When the processing of a message is known to be completed (either by the end-of-message flag or by the message-deallocation command), the cache logic may remove entries associated with the message from both caches (including the hot context cache and the cold context cache). The related ICB entries (containing IOVEC entries) referenced by the removed context should also be freed for reuse.

When an instruction traverses the S-G DMA pipeline (e.g., pipeline 106 shown in FIG. 1), depending on the type of instruction and the state of the tracker entry corresponding to the instruction, different context cache commands may be generated (e.g., by S-G DMA processor 108 shown in FIG. 1) and sent to the two-level context cache system (which includes the hot and cold context caches). In some aspects, there may be five different types of context cache commands, such as commands to read context from the hot context cache (e.g., HOT_READ commands), commands to read context from the cold context cache (e.g., COLD-_READ commands), command to evict context from the hot context cache (e.g., HOT_EVICT commands), commands to transfer context from the hot context cache to the cold context cache (e.g., HOT_2COLD commands), and commands to eliminate (evict as necessary) any cached cold context referenced by a given message ID (e.g., DEAL-LOC_M commands).

The cache-management logic may perform different cache operations based on the received commands. More specifically, a first set of commands may cause the cache-management logic to read the hot context cache and then perform various cache-related operations, whereas a second set of commands may cause the cache-management logic to read the cold context cache and then perform various cache-related operations. More specifically, if the context read from the caches is related to IOVEC processing (e.g., it references entries in the ICB buffer), operations (e.g., eviction and reference count update) related to the ICB entries may be needed. Note that a HOT_2COLD command (i.e., the command to transfer context from the hot context cache to the cold context cache) may initiate a read of both the hot and cold context caches.

Figure 3A:
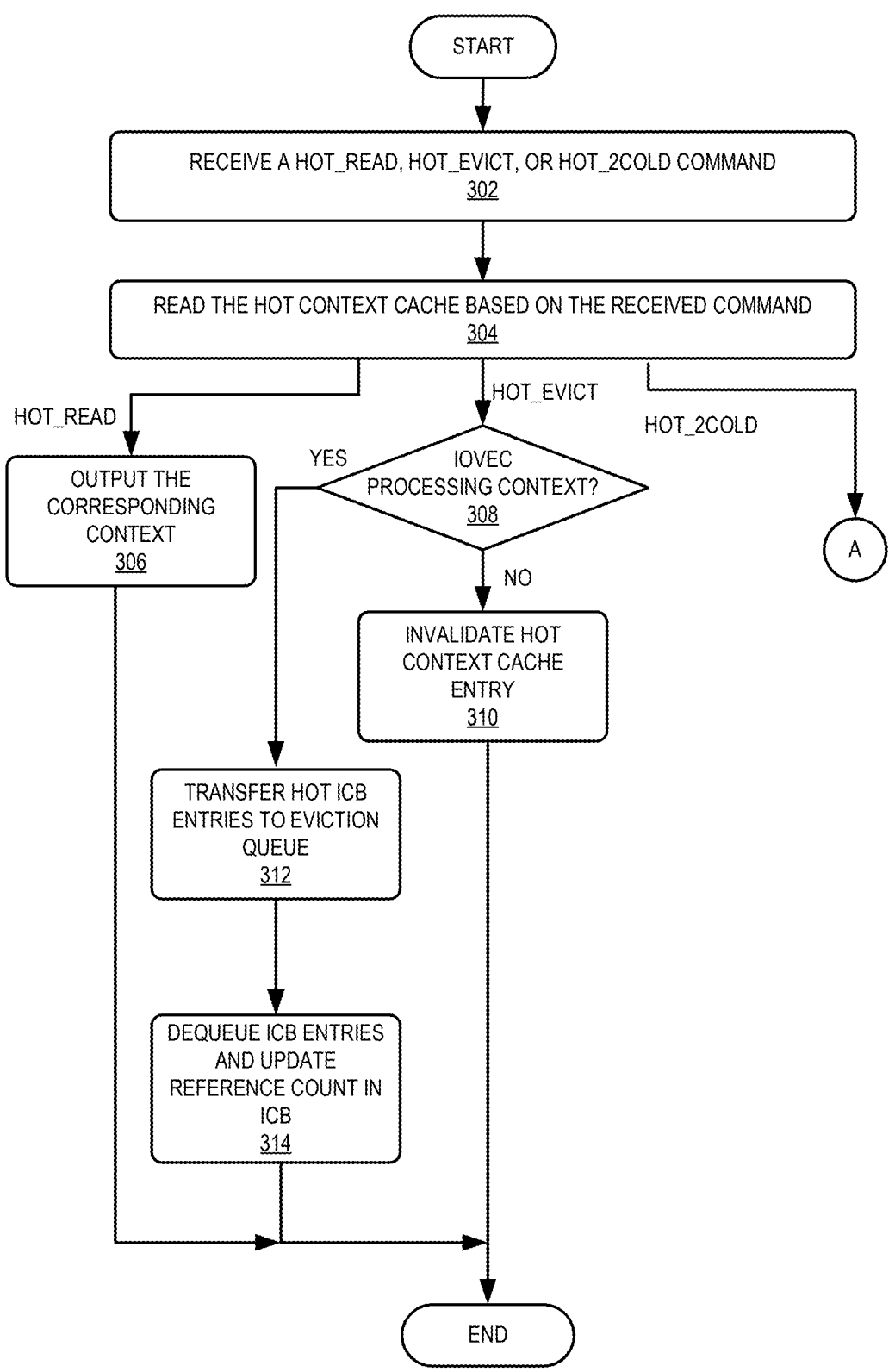
FIG. 3A presents a flowchart illustrating an example process for processing various context cache commands that read the hot context cache, according to one aspect of the instant application.

In some aspects, the HOT_READ, HOT_EVICT, and HOT_2COLD commands may initiate a read operation in the hot context cache. FIG. 3A presents a flowchart illustrating an example process for processing various context cache commands that read the hot context cache, according to one aspect of the instant application. During operation, the cache logic may receive a HOT_READ, HOT_EVICT, or HOT_2COLD command (operation 302) and read the hot context cache based on the received command (operation 304). The command may be selected from instruction tracker 102 by arbitrator 104 shown in FIG. 1 and may specify an address (e.g., cache index) in the hot context cache.

If the command is a HOT_READ command, the hot context cache may output the corresponding context (operation 306), and the cache system process ends. If the context read from the hot context cache references ICB entries, the first ICB entry number in the list may be used to read the ICB buffer. If the command is a HOT_EVICT command, the cache logic may determine whether the context read from the hot context cache is IOVEC processing context (operation 308). In one example, the cache logic may determine whether the context includes a list of entries in the ICB buffer, which stores IOVEC entries previously read from the host memory. If the context is not IOVEC processing context (e.g., it may include derived-datatype processing context that contains nested loop counter values), subsequent to reading the hot context cache, the cache logic may invalidate the corresponding hot context cache entry (operation 310). If the context read from the hot context cache references ICB entries, additional actions are needed to ultimately free the ICB entries for reuse. In one example, the list of ICB entries referenced by the context read from the hot context cache (referred to as hot ICB entries) may be transferred to the eviction queue (operation 312). Subsequently, the list of ICB entries in the eviction queue may be dequeued, and the reference count associated with each listed entry in the ICB buffer is updated, e.g., decremented (operation 314). When the reference count for a given ICB entry reaches 0, the ICB entry is freed for reuse.

If the received command is a HOT_2COLD command, in addition to specifying a location in the hot context cache, the command may specify a location within a way of the cold context cache to transfer the context. In some examples, the RAM address in the cold context cache ways may be derived from the message ID associated with the instruction that generates the HOT_2COLD command. Cache operations related to the HOT_2COLD command continue in FIG. 3B.

Figure 3B:
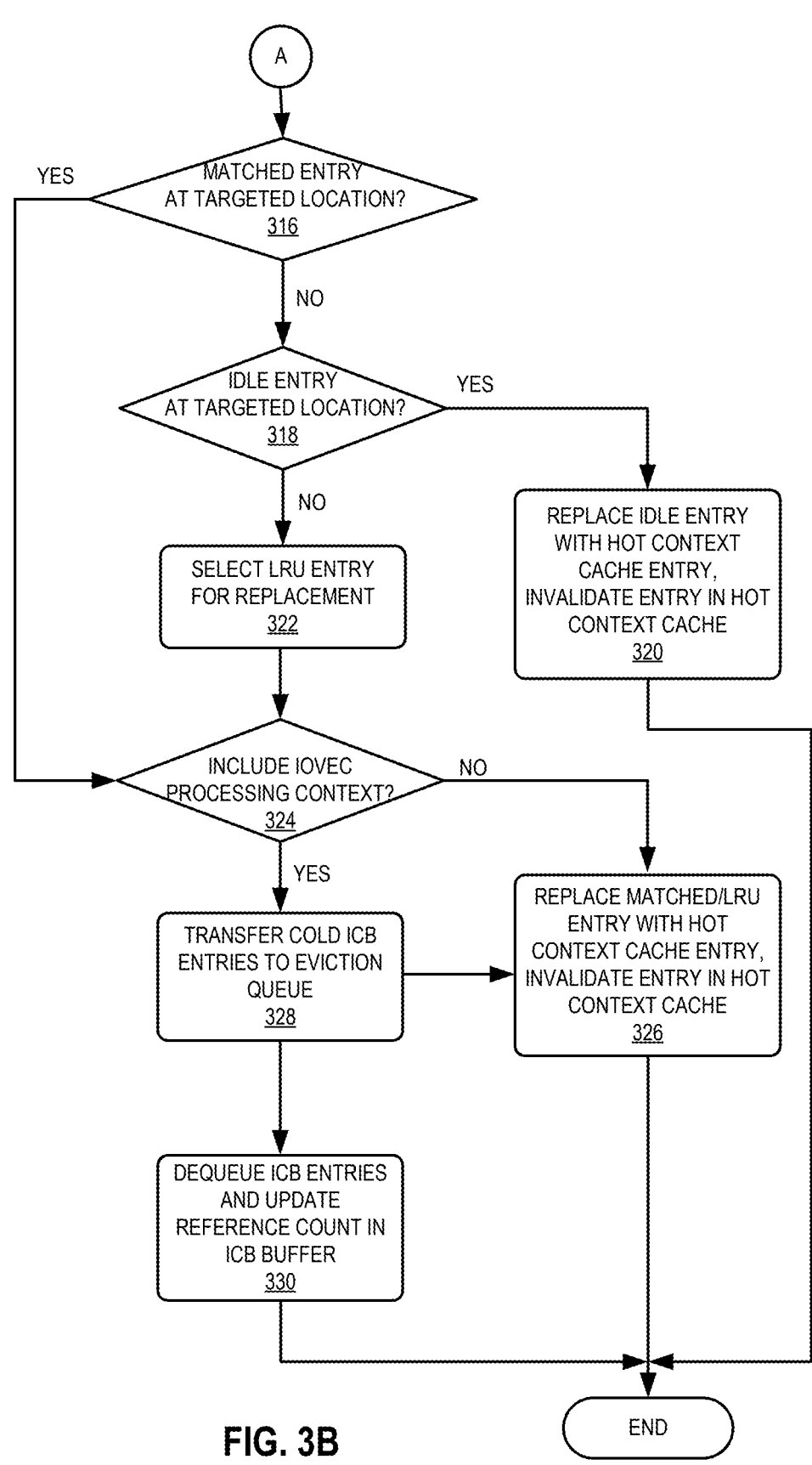
FIG. 3B presents a flowchart illustrating an example process for transferring context from the hot context cache to the cold context cache, according to one aspect of the instant application.

FIG. 3B presents a flowchart illustrating an example process for transferring context from the hot context cache to the cold context cache, according to one aspect of the instant application. In FIG. 3B, subsequent to reading the hot context cache (i.e., operation 304 shown in FIG. 3A), the cache logic may determine whether a matched entry (e.g., an entry with the same message ID and packet sequence number) is stored in a way at the target location in the cold context cache (operation 316).

If a matched entry is found at the target location in the cold context cache, the cache logic may further determine whether the entry contains IOVEC processing context (operation 324). If the entry does not contain IOVEC processing context, the cache logic may replace the matched entry with the context read from the hot context cache and invalidate the corresponding entry in the hot context cache (operation 326). If the entry contains IOVEC processing context, the cache logic may transfer the referenced cold ICB entries to the eviction queue (operation 328). The list of ICB entries may be subsequently dequeued, and the reference count associated with each listed entry in the ICB buffer may be updated (operation 330). When the reference count for a given ICB entry reaches 0, the ICB entry is freed for reuse.

If no matched entry is found, the cache logic may determine whether the target location in any cache way has an idle entry (operation 318). If an idle entry exists, the cache logic may replace the idle entry with the context read from the hot context cache and invalidate the corresponding entry in the hot context cache (operation 320).

If there is no idle entry at the target location, the cache logic may select the LRU entry at the target location for replacement (operation 322). The cache logic may further determine whether the entry includes IOVEC processing context (operation 324). If the entry does not include IOVEC processing context, the cache logic may replace the LRU entry with the context read from the hot context cache and invalidate the corresponding entry in the hot context cache (operation 326). If the entry include IOVEC processing context, the cache logic may transfer the referenced cold ICB entries to the eviction queue (operation 328). The ICB entries may be subsequently dequeued, and the reference count in the ICB buffer may be updated (operation 330).

Figure 3C:
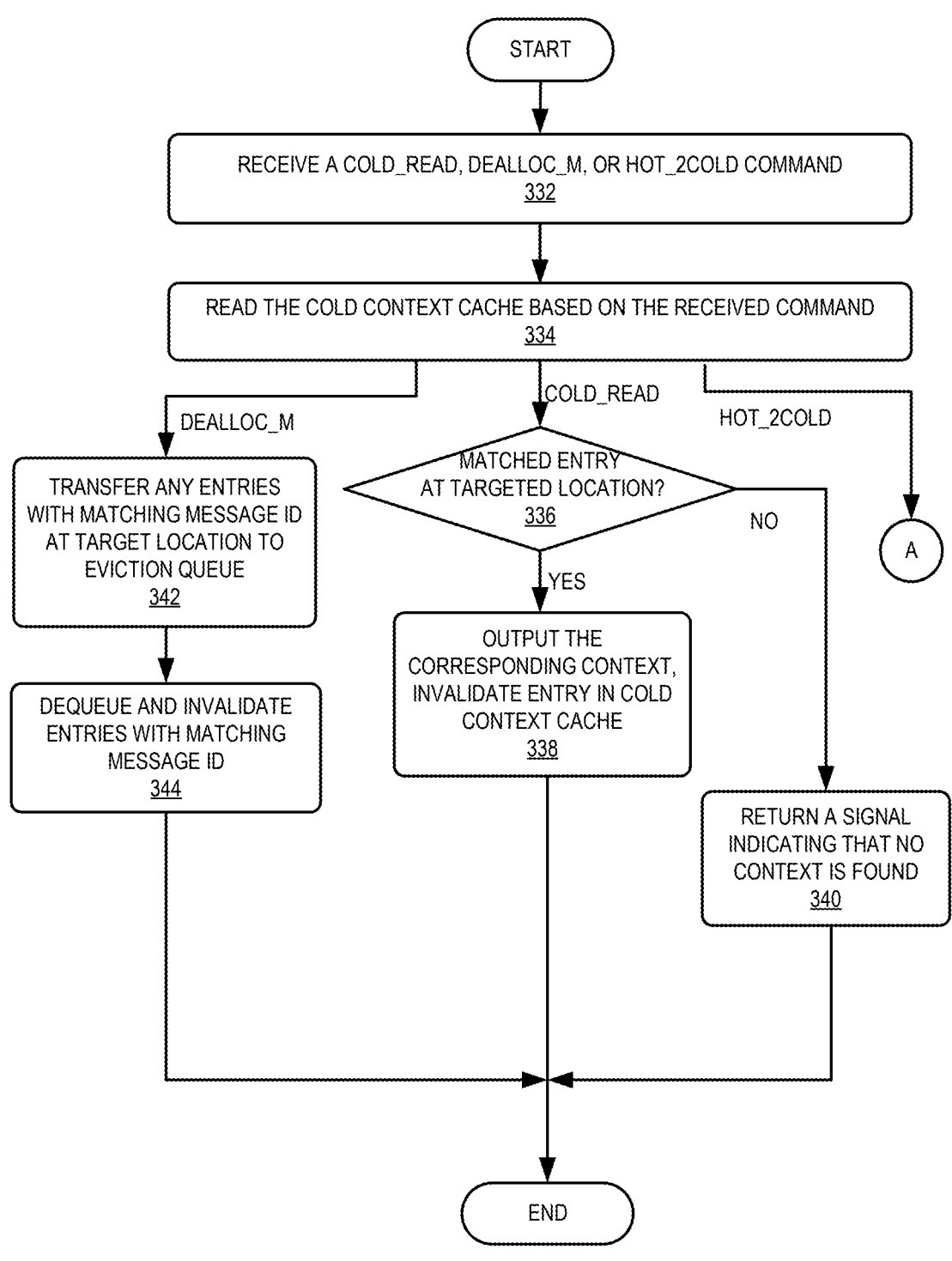
FIG. 3C presents a flowchart illustrating an example process for processing various context cache commands that read the cold context cache, according to one aspect of the instant application.

FIG. 3C presents a flowchart illustrating an example process for processing various context cache commands that read the cold context cache, according to one aspect of the instant application. During operation, the cache logic may receive a COLD_READ, DEALLOC_M, or HOT_2COLD command (operation 332) and read the cold context cache based on the received command (operation 334). The command may be generated when instruction 102 is selected by arbitrator 104 shown in FIG. 1 and may specify a way address in the cold context cache.

If the command is a COLD_READ command, the cache logic may first determine whether there is a matched entry in a way at the target location in the cold context cache (operation 336). For example, the cache logic may compare the message ID and packet sequence number, if applicable, specified by the received command with the message ID associated with the cold cache entry. If the matched entry is found, the cold context cache may simply output the corresponding context and invalidate the entry in the cold context cache (operation 338). If no matched entry is found, the cache logic may return a signal indicating that no context is found (operation 340).

If the command is a DEALLOC_M command (i.e., a command to inform the S-G DMA engine that the processing of a message is complete), the cache logic may transfer any entries with the matching message ID at the target location to the eviction queue (operation 342). Such entries may be subsequently dequeued (i.e., evicted), and the corresponding entries in the cold context cache may be invalidated (operation 344).

If the command is a HOT_2COLD command, subsequent to reading to cold context cache, the process may continue according to the operations shown in FIG. 3B.

Although the example processes in FIGS. 2-3C show a specific order of performing certain operations, the processes are not limited to such an order. Operations shown in succession in the flowchart may be performed in a different order and may be executed concurrently or with partial concurrence or combinations thereof.

Figure 4:
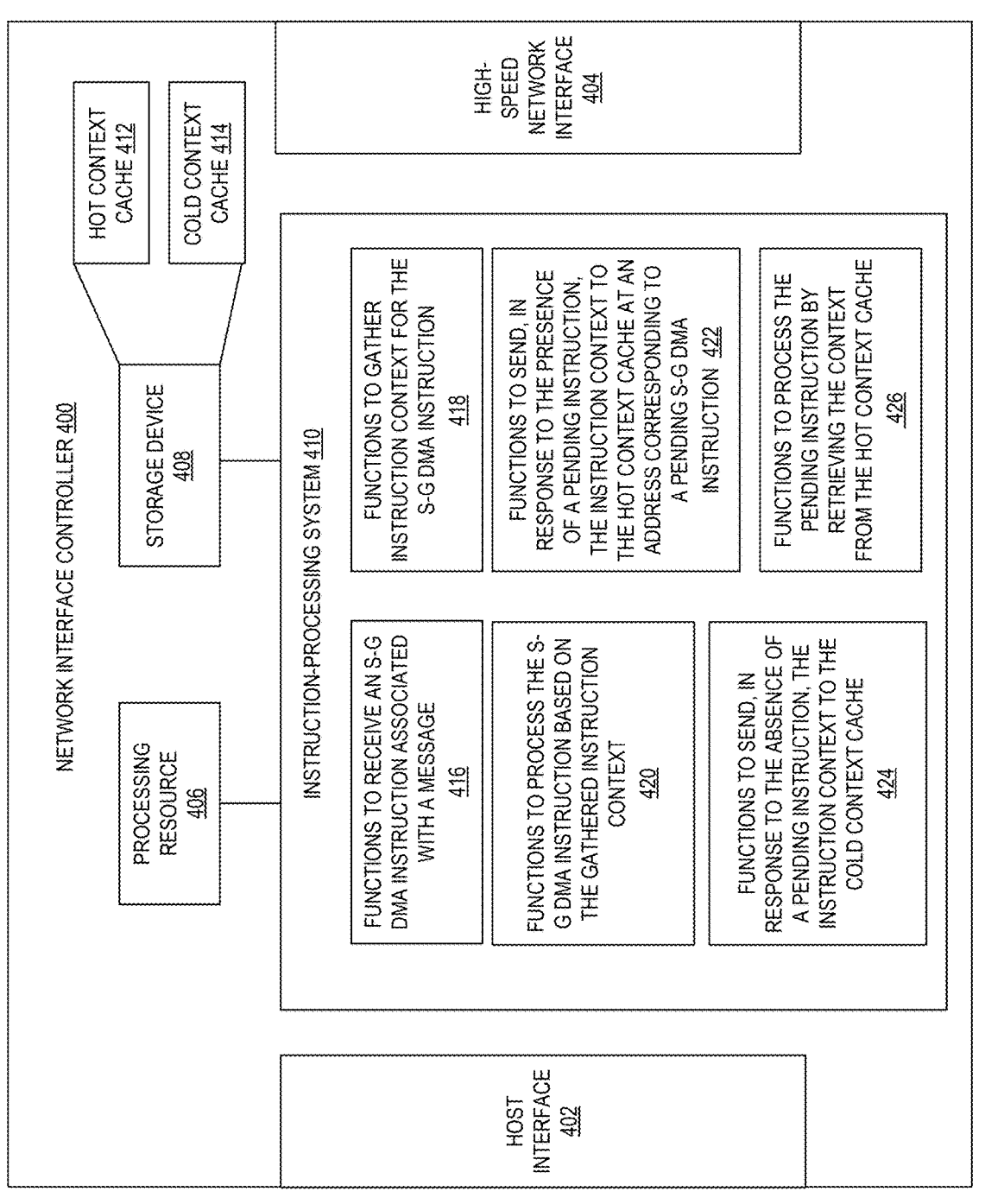
FIG. 4 illustrates an example network interface controller (NIC), according to one aspect of the instant application.

FIG. 4 illustrates an example network interface controller (NIC), according to one aspect of the instant application. NIC 400 may be part of a compute node to provide network connectivity to the compute node. A compute node may include one or more NICs. In some examples, a compute node may include one, two, four, or eight NICs. NIC 400 may include fewer or more entities than those shown in FIG. 4. In the example shown in FIG. 4, a NIC 400 may include at least a host interface (HI) 402 and a high-speed network interface (HNI) 404.

HI 402 may include a peripheral component interconnect (PCI) or a peripheral component interconnect express (PCIe) interface and may be coupled to the host via a host connection with multiple lanes (e.g., PCIe Gen 4 lanes capable of operating at signaling rates up to 25 Gbps per lane). HNI 404 may facilitate a high-speed network connection for communicating with a link in the switch fabric.

NIC 400 may include one or more processing resources (e.g., processing resource 406), one or more storage devices (e.g., storage device 408), and an instruction-processing system 410. In this example, storage device 408 may include volatile storage as well as non-volatile storage and may further include a hot context cache 412 and a cold context cache 414. In some aspects, hot context cache 412 and cold context cache 414 may be implemented using RAMs.

In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a computer-readable storage medium, or a combination thereof. In the examples described herein, the processing resource may fetch, decode, and execute instructions stored on a storage medium (e.g., storage device 408) to perform the functionalities described in relation to the instructions stored on the computer-readable medium. In other examples, the functionalities described in relation to any instructions described herein may be implemented in the form of electronic circuitry, in the form of executable instructions encoded on a computer-readable medium, or a combination thereof. The computer-readable storage medium may be located either in the computing device executing the instructions, or remote from but accessible to the computing device (e.g., via a computer network) for execution.

Instruction-processing system 410 may include any number of software functions, hardware functions, and firmware functions that work together to achieve the goal of managing the two-level cache system comprising the hot and cold context caches. In some aspects, instruction-processing system 410 may include computer functions, which, when executed by processing resource 406, may cause processing resource 406 to perform methods and/or processes described in this disclosure. Specifically, instruction-processing system 410 may include functions 416 to receive an S-G DMA instruction associated with a message, as described above in relation to operation 202 shown in FIG. 2. In some aspects, the message may be an MPI message, which may be associated with a plurality of packets. Each packet corresponds to an S-G DMA instruction. In further aspects, the S-G DMA instruction may include a message ID and a packet sequence number.

Instruction-processing system 410 may include functions 418 to gather instruction context for the S-G DMA instruction, as described above in relation to operation 204 shown in FIG. 2. More specifically, the instruction context may include the memory address information associated with the instruction. In one example, the instruction context may include list of entries in the ICB buffer, each ICB entry containing a set of IOVEC entries previously read from the host memory, with the IOVEC in the host memory comprising a list of memory addresses and sizes. In one more example, the instruction context may include a pointer an ICB buffer entry comprising datatype context fast-forward information, the datatype context fast-forward information comprising up to three nested loop count values and a byte offset within the starting data element.

Instruction-processing system 410 may include functions 420 to process the S-G DMA instruction based on the gathered instruction context, as described above in relation to operation 206 shown in FIG. 2. A plurality of DMA read/write operations may be performed resulting from the S-G DMA instruction. For example, in the outbound direction, a read request may be issued to the host memory using the address information identified by the instruction context, and in the inbound direction, the payload of a received packet may be written to various locations in the host memory based on the instruction context.

Instruction-processing system 410 may include functions 422 to send, in response to the presence of a pending instruction, the instruction context to the hot context cache at an address corresponding to the pending S-G DMA instruction, as described above in relation to operation 210 shown in FIG. 2. More specifically, the pending instruction refers to an instruction in instruction tracker 102 having the same message ID as the processed instruction and a subsequent packet sequence number. The cache index may correspond to the tracker entry number of the pending instruction.

Instruction-processing system 410 may include functions 424 to send the instruction context to the cold context cache in response to the absence of the pending instruction, as described above in relation to operation 214 shown in FIG. 2. When there is no pending instruction, the context should be cached in the cold context cache. Because the S-G DMA processor does not directly write to the cold context cache, the processor may first write the context to the hot context cache at a location corresponding to the processed instruction (e.g., according to its tracker entry number) and then a HOT_2COLD command is generated to transfer the context to the cold context cache at a location corresponding to the message ID and optionally the packet sequence number specified by the instruction.

Instruction-processing system 410 may include functions 426 to process the pending S-G DMA instruction by retrieving the instruction context from the hot context cache, as described above in relation to operation 212 shown in FIG. 2. The S-G DMA processer may access the cache location corresponding to the pending instruction (e.g., according to its tracker entry number) to retrieve the instruction context.

NIC 400 may include fewer or more entities than those shown in FIG. 4. For example, NIC 400 may include functions to invalidate/evict entries in the hot or cold context cache. NIC 400 may further include functions to remove ICB entries referenced by evicted cache entries.

FIG. 5 illustrates a computer-readable medium that facilitates the operation of the two-level cache system, according to one aspect of the instant application. CRM 500 may be a non-transitory computer-readable medium or device storing computer functions that when executed by a computer or processing resource cause the computer or processing resource to perform a method. As used herein, a "computer-readable storage medium" may be any electronic, magnetic, optical, or other physical storage apparatus to contain or store information such as executable codes, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer-readable storage medium described herein may be non-transitory.

CRM 500 may store codes 510 to receive an S-G DMA instruction associated with a message, as described above in relation to operation 202 shown in FIG. 2; codes 520 to gather instruction context for the S-G DMA instruction, as described above in relation to operation 204 shown in FIG.

2; codes 530 to process the S-G DMA instruction based on the gathered instruction context, as described above in relation to operation 206 shown in FIG. 2; codes 540 to send, in response to the presence of a pending instruction, the instruction context to the hot context cache at an address corresponding to the pending S-G DMA instruction, as described above in relation to operation 210 shown in FIG. 2; codes 550 to send the instruction context to the cold context cache in response to the absence of the pending instruction, as described above in relation to operation 214 shown in FIG. 2; and codes 560 to process the pending S-G DMA instruction by retrieving the instruction context from the hot context cache, as described above in relation to operation 212 shown in FIG. 2.

CRM 500 may store more codes than those shown in FIG. 5. For example, CRM 500 may store codes to invalidate/evict entries in the hot or cold context cache and codes to remove ICB entries referenced by evicted cache entries.

In general, aspects of the disclosure solve the technical problem of efficiently cache instruction context when processing S-G DMA instructions. The NIC performing the S-G DMA operations may include a two-level context cache system comprising a hot context cache for storing imminently needed instruction context (i.e., hot context) and a cold context cache for storing instruction context that may not be needed for a while (i.e., cold context). More specifically, after processing an instruction associated with a message (e.g., an MPI message), the S-G DMA processor may determine whether there is a pending instruction of the same message. If so, the processor may write the instruction context in the hot context cache at an address corresponding to the pending instruction. If not, the process may cause the instruction context to be transferred to the cold context cache at an address corresponding to the message ID. After all instructions associated with a message are processed, cache entries associated with the message and ICB entries referenced by the context may be removed. If the processor pauses the processing of an instruction, the processor may write the instruction context to the hot context cache at a location corresponding to the instruction. When the processor resumes processing the instruction, the processor may retrieve the instruction context from the hot context cache.

One aspect of the instant disclosure may provide a system and method for processing scatter-gather direct memory access (S-G DMA) instructions. During operation, the system may receive an S-G DMA instruction associated with a message and gather instruction context for the S-G DMA instruction. An S-G DMA processor may process the S-G DMA instruction based on the gathered instruction context and determine whether there exists a pending S-G DMA instruction associated with the message. In response to the presence of a pending DMA instruction, the system stores the instruction context in a hot context cache at an address corresponding to the pending DMA instruction. In response to the absence of a pending DMA instruction, the system stores the instruction context in a cold context cache.

In a variation on this aspect, storing the instruction context in the cold context cache may include writing the instruction context into the hot context cache at an address corresponding to the processed S-G DMA instruction and transferring the instruction context from the hot context cache to the cold context cache.

In a variation on this aspect, the hot context cache may include a one-way cache, and the cold context cache may include a four-way cache.

In a further variation, transferring the instruction context from the hot context cache to the cold context cache may include replacing an existing entry in the cold context cache at a target location.

In a variation on this aspect, the system may process the pending S-G DMA instruction based on the instruction context stored in the hot context cache.

In a variation on this aspect, the system may receive an additional instruction associated with the message, retrieve the instruction context stored in the cold context cache, and process the additional instruction based on the instruction context retrieved from the cold context cache.

In a variation on this aspect, a respective S-G DMA instruction comprises a message identifier corresponding to the message and a packet sequence number.

In a variation on this aspect, the instruction context may include a list of entries in a buffer, a respective buffer entry storing a group of input-output vector (IOVEC) entries and/or datatype context fast-forward information.

In a variation on this aspect, the S-G DMA processor may pause the processing of the S-G DMA instruction, write the instruction context to the hot context cache at an address corresponding to the paused S-G DMA instruction, and resume the processing of the S-G DMA instruction by retrieving the instruction context from the hot context cache.

In a variation on this aspect, in response to determining that the processed S-G DMA instruction is the last instruction associated with the message or receiving an external command indicating that processing of the message has been completed, the system may remove entries associated with the message from the hot and cold context caches.

One aspect of the instant disclosure may provide a scatter-gather direct memory access (S-G DMA) engine for processing S-G DMA instructions. The S-G DMA engine may include an S-G DMA pipeline to gather instruction context for an S-G DMA instruction associated with a message, an S-G DMA processor to process the S-G DMA instruction based on the gathered instruction context, a hot context cache, and a cold context cache. Subsequent to processing the S-G DMA instruction, the S-G DMA processor is to store the instruction context in the hot context cache at an address corresponding to the pending DMA instruction in response to determining the presence of a pending DMA instruction associated with the message and store the instruction context in the cold context cache in response to determining the absence of a pending DMA instruction.

One aspect of the instant disclosure may provide a network interface controller comprising a host interface for receiving messages from and transmitting messages to a host, a network interface, and a scatter-gather direct memory access (S-G DMA) engine for processing S-G DMA instructions associated with the messages. The S-G DMA engine may include an S-G DMA pipeline to gather instruction context for an S-G DMA instruction associated with a message, an S-G DMA processor to process the S-G DMA instruction based on the gathered instruction context, a hot context cache, and a cold context cache. Subsequent to processing the S-G DMA instruction, the S-G DMA processor is to store the instruction context in the hot context cache at an address corresponding to the pending DMA instruction in response to determining the presence of a pending DMA instruction associated with the message and store the instruction context in the cold context cache in response to determining the absence of a pending DMA instruction.

In this disclosure, the functions include a plurality of logic units capable of performing predetermined logic function described throughout the disclosure. The functions shown in FIGS. 2 and 3 may be implemented using any form of hardware, software, or a combination thereof. For example, one or more processors, controllers, ASICS, PLAS, PALs, CPLDs, FPGAs, logical components, software routines or other mechanisms might be implemented to make up a circuit. In implementation, the various functions described herein might be implemented as discrete circuits or the functions and features described can be shared in part or in total among one or more circuits. Even though various features or elements of functionality may be individually described or claimed as separate functions, these features and functionality can be shared among one or more common functions, and such description shall not require or imply that separate circuits are required to implement such features or functionality.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing description is presented to enable any person skilled in the art to make and use the aspects and examples and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:
   receiving a scatter-gather direct memory access (S-G DMA) instruction associated with a message;
   gather instruction context for the S-G DMA instruction;
   processing, by an S-G DMA processor, the S-G DMA instruction based on the gathered instruction context;
   determining whether there exists a pending S-G DMA instruction associated with the message;
   in response to presence of the pending S-G DMA instruction, storing the instruction context in a hot context cache at an address corresponding to the pending S-G DMA instruction; and in response to absence of the pending S-G DMA instruction, storing the instruction context in a cold context cache.

2. The method of claim 1, wherein storing the instruction context in the cold context cache comprises:
   writing the instruction context into the hot context cache at an address corresponding to the processed S-G DMA instruction; and
   transferring the instruction context from the hot context cache to the cold context cache.

3. The method of claim 1, wherein the hot context cache comprises a one-way cache, and wherein the cold context cache comprises a four-way cache.

4. The method of claim 3, wherein transferring the instruction context from the hot context cache to the cold context cache comprises replacing an existing entry in the cold context cache at a target location.

5. The method of claim 1, further comprising processing the pending S-G DMA instruction based on the instruction context stored in the hot context cache.

6. The method of claim 1, further comprising:
   receiving an additional instruction associated with the message;
   retrieving the instruction context stored in the cold context cache; and
   processing the additional instruction based on the instruction context retrieved from the cold context cache.

7. The method of claim 1, wherein a respective S-G DMA instruction comprises a message identifier corresponding to the message and a packet sequence number.

8. The method of claim 1, wherein the instruction context comprises a list of entries in a buffer, a respective buffer entry storing a group of input-output vector (IOVEC) entries and/or datatype context fast-forward information.

9. The method of claim 1, further comprising:
   pausing, by the S-G DMA processor, the processing of the S-G DMA instruction;
   writing the instruction context to the hot context cache at an address corresponding to the paused S-G DMA instruction; and
   resuming the processing of the S-G DMA instruction by retrieving the instruction context from the hot context cache.

10. The method of claim 1, further comprising:
    in response to determining that the processed S-G DMA instruction is the last instruction associated with the message or receiving an external command indicating that processing of the message has been completed, removing entries associated with the message from the hot and cold context caches.

11. A scatter-gather direct memory access (S-G DMA) engine for processing S-G DMA instructions, the S-G DMA engine comprising:
    an S-G DMA pipeline to gather instruction context for an S-G DMA instruction associated with a message;
    an S-G DMA processor to process the S-G DMA instruction based on the gathered instruction context;
    a hot context cache; and
    a cold context cache;
    subsequent to processing the S-G DMA instruction, the S-G DMA processor is to:
       in response to determining presence of a pending S-G DMA instruction associated with the message, store the instruction context in the hot context cache at an address corresponding to the pending S-G DMA instruction; and in response to determining absence of the pending S-G DMA instruction, store the instruction context in the cold context cache.

12. The S-G DMA engine of claim 11, wherein the S-G DMA processor stores the instruction context in the cold context cache by:

writing the instruction context into the hot context cache at an address corresponding to the processed S-G DMA instruction; and transferring the instruction context from the hot context cache to the cold context cache.

13. The S-G DMA engine of claim 12, wherein, while transferring the instruction context from the hot context cache to the cold context cache, the S-G DMA processor is to replace an existing entry in the cold context cache.

14. The S-G DMA engine of claim 11, wherein the S-G DMA processor is further to process the pending S-G DMA instruction based on the instruction context stored in the hot context cache.

15. The S-G DMA engine of claim 11, wherein a respective S-G DMA instruction comprises a message identifier corresponding to the message and a packet sequence number.

16. The S-G DMA engine of claim 11, wherein the instruction context comprises a list of entries in a buffer, a respective buffer entry storing a group of input-output vector (IOVEC) entries and/or datatype context fast-forward information.

17. The S-G DMA engine of claim 11, wherein the S-G DMA processor is to:

pause the processing of the S-G DMA instruction;

write the instruction context to the hot context cache at an address corresponding to the paused S-G DMA instruction; and resume the processing of the S-G DMA instruction by retrieving the instruction context from the hot context cache.

18. The S-G DMA engine of claim 11, wherein the S-G DMS processor is further to:

in response to determining that the processed S-G DMA instruction is the last instruction associated with the message or receiving an external command indicating that processing of the message has been completed, remove entries associated with the message from the hot and cold context caches.

19. A network interface controller, comprising:

a host interface for receiving messages from and transmitting messages to a host;

a network interface; and a scatter-gather direct memory access (S-G DMA) engine for processing S-G DMA instructions associated with the messages, the S-G DMA engine comprising:

an S-G DMA pipeline to gather instruction context for an S-G DMA instruction associated with a message;

an S-G DMA processor to process the S-G DMA instruction based on the gathered instruction context;

a hot context cache; and a cold context cache;

subsequent to processing the S-G DMA instruction, the S-G DMA processor is to:

in response to determining presence of a pending S-G DMA instruction associated with the message, store the instruction context in the hot context cache at an address corresponding to the pending S-G DMA instruction; and in response to determining absence of the pending S-G DMA instruction, store the instruction context in the cold context cache.

20. The network interface controller of claim 19, wherein the S-G DMA processor stores the instruction context in the cold context cache by:

writing the instruction context into the hot context cache at an address corresponding to the processed S-G DMA instruction; and transferring the instruction context from the hot context cache to the cold context cache.

* * * * *